(12) United States Patent
Katsu et al.

(10) Patent No.: US 7,212,257 B2
(45) Date of Patent: May 1, 2007

(54) LIQUID CRYSTAL DISPLAY DEVICE, SIDE BACKLIGHT UNIT, LAMP REFLECTOR AND REFLECTION MEMBER

(75) Inventors: Yoshihiro Katsu, Sagamihara (JP); Masaru Suzuki, Yokohama (JP); Michikazu Noguchi, Sagamihara (JP); Akiko Nishikai, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 11/142,925

(22) Filed: Jun. 2, 2005

(65) Prior Publication Data
US 2005/0264718 A1 Dec. 1, 2005

Related U.S. Application Data

(62) Division of application No. 10/056,388, filed on Jan. 24, 2002, now abandoned.

(30) Foreign Application Priority Data
Jan. 31, 2001 (JP) ............... 2001-024758

(51) Int. Cl.
*G02F 1/1335* (2006.01)
(52) U.S. Cl. .......................... 349/65; 349/61
(58) Field of Classification Search ............. 349/61–67
See application file for complete search history.

(56) References Cited

U.S. PATENT DOCUMENTS 5,224,770 A * 7/1993 Simmons et al. ............. 362/29
5,340,604 A * 8/1994 Atsushi ....................... 427/10
6,064,455 A * 5/2000 Kim .......................... 349/113
6,480,250 B1 * 11/2002 Matsufuji et al. ........... 349/113

FOREIGN PATENT DOCUMENTS

| JP | 57-207203 | * 12/1982 |
| JP | 05177758 A | 5/1992 |
| JP | 2001-166295 | 6/2001 |

* cited by examiner

*Primary Examiner*—Dung T. Nguyen
(74) *Attorney, Agent, or Firm*—Todd M. C, Li

(57) ABSTRACT

A liquid crystal display (LCD) device having a side backlight unit that minimizes or eliminates extraneous bright lines on the LCD panel. The side backlight unit includes a lamp reflector and lamp disposed on a light incident side surface of a light guide plate. A light reflection layer is formed on the inner surface of the lamp reflector, and a transparent protective layer is formed on the reflection layer. The transparent protective layer has a thickness less than 5 micrometers. The lamp reflector has arm portions that sandwich the light guide plate on the front and back surfaces at the lamp side of the light guide plate. A light transmission region between the arm portions of the lamp reflector and the front and back surfaces of the light guide plate has a thickness less than 5 micrometers.

2 Claims, 7 Drawing Sheets

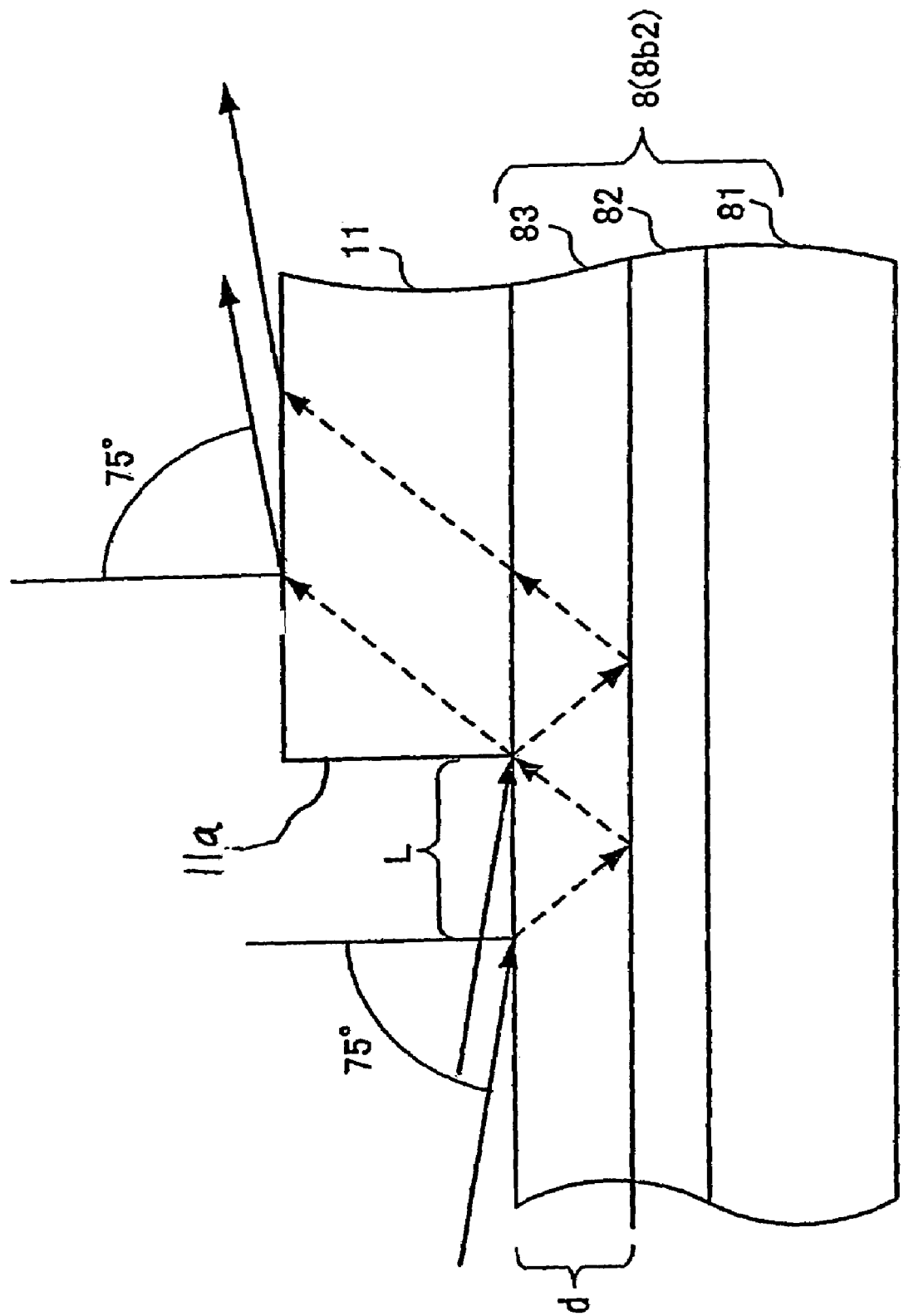

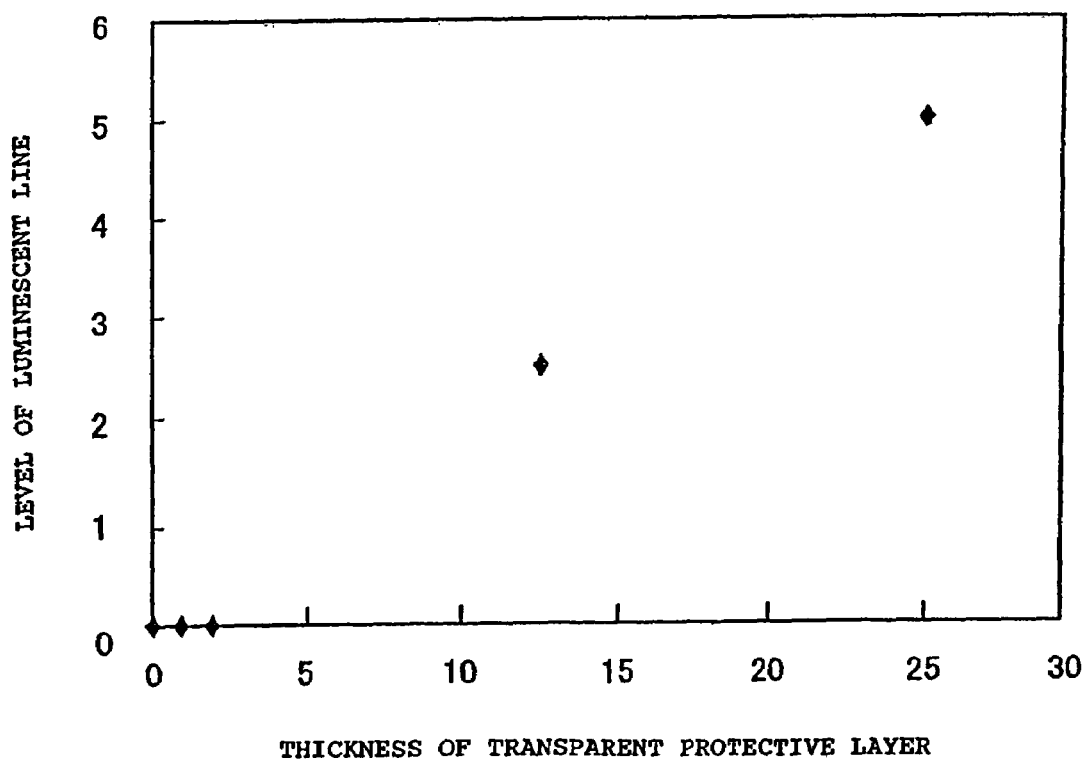

LIQUID CRYSTAL DISPLAY DEVICE, SIDE BACKLIGHT UNIT, LAMP REFLECTOR AND REFLECTION MEMBER

CROSS-REFERENCE TO RELATED PATENT APPLICATIONS

This Patent Application is a Divisional Patent Application of U.S. patent application Ser. No. 10/056,388, filed on Jan. 24, 2002 now abandoned.

FIELD OF THE INVENTION

The present invention relates to a reflection member, more particularly to a lamp reflector for use in a side backlight unit in a liquid crystal display (LCD) device.

BACKGROUND OF THE INVENTION

A liquid crystal display (LCD) device has become remarkably widespread for use as an image display device for a personal computer and other various monitors. Generally, a liquid crystal display device is configured in such a manner that a backlight unit is provided as a planar light source for illumination, disposed on a backside of a liquid crystal display panel, and so that a liquid crystal surface having a specified area is irradiated on the whole with even brightness, thus enabling visualization of an image formed on the liquid crystal surface.

The backlight unit employs a hot-cathode or cold-cathode fluorescent lamp as a light source. Since light from the fluorescent lamp is linear light, this linear light must be converted into planar light for irradiating the entire surface of a liquid crystal display panel. For this purpose, heretofore, two systems of backlight units have been employed: a direct backlight unit; and a side (edge-light type) backlight unit. A direct backlight unit is configured in such a manner that a fluorescent lamp is placed immediately under a liquid crystal display panel, and a dimmer plate and a diffusion plate are disposed thereon. By contrast, a side backlight unit is configured in such a manner that one or two fluorescent lamps are disposed on one or two sides of a light guide plate made of transparent resin. Light made incident onto the light guide plate is then directed towards the liquid crystal display panel by a reflection structure provided on a front, back or both back and front of the light guide plate, thus even planar light is given thereto by use of light diffusion. Since a side backlight unit can be made thinner than the direct backlight unit, it is suitable for use as a display device in a portable device such as a notebook computer.

The following is a description of the principle of light emission of a side backlight unit. Light incident onto the light guide plate from the lamp travels through the light guide plate while making total internal reflection resulting from a difference in refractive indices (dielectric constants) between the material constituting the light guide plate and air. On at least one surface of the light guide plate, which is the back thereof in general, a reflection structure is provided for promoting the emission of light from the light guide plate. The total reflection with the air interface is disordered when the light traveling through the light guide plate strikes the reflection structure, and when the light is emitted from the front of the light guide plate. Note that, with reference to the light guide plate, the front signifies the surface of the light guide plate facing towards the liquid crystal display panel, and the back signifies the surface of the light guide plate opposite the front. Moreover, the surface from which the light is emitted is referred to as an emitting surface. Accordingly, the front includes the emitting surface. Usually the reflection structure is formed on the back of the light guide plate, and the light incident onto the light guide plate from the light source is emitted from the emitting surface of the light guide plate by the reflection structure. In order to allow an even luminance distribution at the emitting surface, a diffusion pattern is provided on the reflection structure that is less dense on the lamp side and grades to a higher density away from the lamp.

However, although the luminance distribution is made even, in prior art LCD devices using side backlight units, a problem occurs in that bright lines are generated at periodic positions from the lamp. Moreover, as the size of screens has increased, the distance from the screen to the lamp has decreased, and the bright lines have become increasingly conspicuous.

FIG. 8 is a drawing illustrating the generation of the bright lines. As shown in FIG. 8, particularly in the vicinity of a lamp R, bright lines K are generated on the screen. The bright lines K are portions having luminance higher than a periphery thereof lying parallel to the lamp R in the shape of a line.

The cause of the generation of the bright lines K has been pursued by those skilled in the art. As a result, a plurality of generation mechanisms for the bright lines K, particularly due to structural factors in the vicinity of the lamp R, have been clarified, and countermeasures for individual causes have been taken. However, the current situation is that the generation of the bright lines K has not yet been completely eliminated, and this problem remains to be solved.

SUMMARY OF TE INVENTION

In this connection, one objective of the present invention is to provide a side backlight unit and a liquid crystal display device that are capable of reducing or preventing the generation of bright lines.

Light from the lamp is made incident onto the light guide plate directly or after being reflected in the lamp reflector. Due to the difference in refractive indices between the light guide plate and air, regardless of the angle made by the light incident from the incident surface of the light guide plate, the light is converged within an angle of about 42 degrees inside the light guide plate by refraction when the refractive index n is equal to about 1.5. Thereafter, the light propagates through the inside of the light guide plate while repeating the total internal reflection with the air interface. However, the above is an ideal case which assumes that the entirety of the light is made incident from the incident surface, that the surface of the light guide plate as an interface with air is a mirror surface, and that the incident surface is set at an angle of 90 degrees with respect to the back and front thereof. In fact, the surface of the light guide plate constituting the interface is not a complete mirror surface, and has some scattering properties. It has been found, by using an atomic force microscope (AFM) to study the light guide plate of a commercially available liquid crystal display device, that the surface of the light guide plate has unevenness of about 100 nm.

The inventors of the present invention investigated the possibility that light is incident from portions other than the incident surface onto the light guide plate. In the side backlight unit, the lamp is accommodated, and the lamp reflector for reflecting the light to the incident surface of the light guide plate is provided. The lamp reflector is disposed on an incident surface side of the light guide plate, and is integrated with the light guide plate by sandwiching the front and the back of the light guide plate. What the inventors of the present invention paid attention to is the place where the lamp reflector sandwiches the light guide plate.

Here, the lamp reflector is configured in such a manner that a sheet having specified rigidity, made of brass or stainless steel (SUS) or the like, is bent in an approximately U-character shape, and a light reflection layer is formed on an inner circumference surface thereof. The lamp reflector serves as a protector for the lamp and has a role in making the light emitted from the lamp incident onto the light guide plate efficiently. In general, a light reflection layer may be formed by using a sheet coated with a reflective material, such as silver (Ag) or aluminum (Al), or a resin sheet containing a white pigment. In many cases, a sheet coated with Ag (an Ag sheet) is used as a reflection layer since Ag has high reflectivity.

Ag has high reflectivity in its material property. However, oxidation of Ag will significantly lower the reflectivity. Therefore, in order to prevent the oxidation of Ag, a protective film for protecting the Ag surface is formed on the Ag sheet. In many cases, such a protective film is formed using transparent polyethylene terephthalate (PET) for maintaining the reflective function of Ag as well as for functioning to prevent the oxidation of Ag. The Ag sheet is obtained by depositing an Ag film on the PET sheet by a method such as sputtering. The Ag sheet is adhered to a support sheet, which serves as a support body, made of brass, stainless steel and the like, with the Ag film surface facing thereto. For the adhesion, an adhesive or a tackiness agent is used for example. Then, the support sheet with the Ag sheet adhered thereto is bent into a specified shape, and thus the lamp reflector is obtained. A very thin PET sheet cannot be used when productivity is a concern since a specified strength is required therefor in the step of depositing Ag. Hence, a PET sheet with a thickness of about 25 micrometers is conventionally used.

FIG. 3a is a sectional view schematically showing a configuration of a backlight unit 10 and FIG. 3b is a partially enlarged view of the same. As shown in FIG. 3, a lamp reflector 8 includes: a lamp accommodating portion 8a accommodating a lamp 2; an upper arm 8b1; and a lower arm 8b2. The upper and lower arms 8b1 and 8b2 of the lamp reflector 8 sandwich a light guide plate 11 by back and front thereof on the incident surface 11a side of the light guide plate 11. As shown in the enlarged view FIG. 3b, the lamp reflector 8 has a sectional structure, in which a light reflection layer 82, composed of, for example, an Ag film, and a transparent protective layer 83 for protecting the light reflection layer 82 are sequentially laminated on a reflector body 81. As described above, a conventional lamp reflector has used a PET sheet with Ag deposited thereon as the light reflection layer 82 and also the transparent protective layer 83. Note that the above-described adhesive layer is not shown in FIG. 3b. The transparent protective layer 83 can be regarded as a light transmission region existing between the light guide plate 11 and the light reflection layer 82. The inventors of the present invention paid attention to the transparent protective layer 83. Specifically, the inventors hypothesized that the light being incident onto the light guide plate 11 via the transparent protective layer 83 could be one of the factors contributing to the generation of the bright lines. FIG. 4 is a drawing illustrating this hypothesis. As shown in FIG. 4, while light incident onto the transparent protective layer 83 is reflected by the light reflection layer 82, light incident onto the transparent protective layer 83 in the vicinity of the light guide plate 11 is reflected by the light reflection layer 82 and then is incident onto the light guide plate 11 from the back thereof. The incident angle of the latter case does not coincide with the incident angle of light incident from the incident surface 11a of the light guide plate 11. Specifically, due to the existence of the transparent protective layer 83, which acts as a light transmission region, the condition that the entirety of light is incident from the incident surface 11a is not satisfied, the condition being one of the above-described assumptions for the light to travel through the light guide plate 11 with total reflection.

Based on the above hypotheses, the inventors of the present invention prepared a lamp reflector, using a PET sheet with an Ag film deposited thereon similarly to the prior art was used, and laminating the PET sheet on a reflector body with the Ag film facing away from the reflector body. Then, the screen was observed for the possible generation of the bright lines. According to the lamp reflector thus prepared, since the Ag film is in direct contact with the light guide plate, there will not exist a region where the light is transmitted between the light guide plate and the Ag film as seen in the prior art. As a result of the observation, it was confirmed that the bright lines were hardly generated. Some bright lines were generated due to the angle of the light guide plate not being formed to have an ideal angle of 90 degrees. And when the relation between the thickness of the transparent protective layer on the Ag film and the generation of the bright lines was further observed, it was also determined that the bright lines could be suppressed to the extent where, as a practical matter, the problem does not occur. This result can be achieved by setting the thickness of the protective layer to be less than 5 micrometers. The present invention was made based on the above observed results and the findings. According to the present invention, provided is a liquid crystal display device, comprising: a liquid crystal display panel; a light guide plate including at least one incident surface and an emitting surface for emitting light from the incident surface, the light guide plate being provided on a backside of the liquid crystal display panel; a lamp disposed along the incident surface of the light guide plate; and a lamp reflector including a space for accommodating the lamp, a light reflection layer, preferably composed of a metal film, and a transparent protective layer formed on the light reflection layer, the light reflection layer and the transparent protective layer being formed on an inner circumference surface of the lamp reflector, wherein the thickness of the transparent protective layer is less than 5 micrometers.

According to the liquid crystal display device of the present invention, since the thickness of the transparent protective layer is set at less than 5 micrometers, the generation of the bright lines can be reduced or prevented.

Moreover, according to the present invention, provided is a side backlight unit, comprising: a light guide plate including at least one incident surface and an emitting surface for emitting light incident from the incident surface; a lamp disposed along the incident surface of the light guide plate; and a lamp reflector for reflecting light irradiated from the lamp and for guiding the light to the incident surface, wherein the lamp reflector includes: an arm unit for sandwiching back and front of the light guide plate on the incident surface side; and a lamp accommodating portion for accommodating the lamp, and a light reflection layer, preferably an Ag film, formed on an inner circumference surface of the lamp reflector, and a light transmission region between the Ag film on the arm unit and any one of the back and front of the light guide plate, wherein the thickness of the light transmission region is less than 5 micrometers.

As described above, the transparent protective layer formed on the lamp reflector becomes one of the factors contributing to the generation of the bright lines. Accordingly, in the above-described liquid crystal display device of the present invention, the thickness of the transparent protective layer is limited to less than 5 micrometers. However, if a light transmission region, allowing the incidence of light from the back or front of the light guide plate, exists in addition to presence of the transparent protective layer of the lamp reflector, and if such a light transmission region cannot be eliminated, it can be said that the emission of the bright lines cannot be effectively controlled. Therefore, a side backlight unit in accordance with the present invention includes a light transmission region between the Ag film on the arm unit and the back or front of the light guide plate that has a thickness that is regulated to be less than 5 micrometers.

As apparent from the above description, the present invention adopts a configuration that reduces the influence of light incident onto the light guide plate through the transparent protective layer formed on the lamp reflector. Hence, according to the present invention, provided is a side backlight unit, comprising: a light guide plate including at least one incident surface and an emitting surface for emitting light incident from the incident surface; a lamp disposed along the incident surface of the light guide plate; and a lamp reflector including an accommodation space for accommodating the lamp, a light reflection layer for reflecting light irradiated from the lamp and guiding the light to the incident surface of the light guide plate, and a transparent protective layer for protecting the light reflection layer, the light reflection layer and the transparent protective layer being formed on an inner circumference surface of the lamp reflector, wherein the transparent protective layer is deposited on the light reflection layer after the light reflection layer is deposited on a reflector body.

In the side backlight unit of the present invention, the transparent protective layer is formed by deposition thereof on the light reflection layer after the light reflection layer is deposited. In conventional methods using a PET sheet, the thickness of the PET sheet cannot be thinner than about 25 micrometers. Specifically, in the case where a process is employed as in the prior art, in which the Ag sheet is obtained by depositing the Ag film on the PET sheet followed by adhesion of the Ag sheet on the reflector body, at present, it would be difficult to realize the results achieved by the present invention. Therefore, a process is proposed in accordance with the present invention, in which the transparent protective layer is deposited after the light reflection layer is deposited. For example, the present invention may be realized by first depositing on the inner circumference surface of a lamp reflector body, an Ag film by a process such as sputtering or vapor deposition, and then depositing an SiO2 film or the like by a process such as sputtering or vapor deposition. As well known, sputtering or vapor deposition are examples of processes suitable for thin film formation.

Furthermore, according to the present invention, provided is a lamp reflector for accommodating a lamp as a light source and reflecting received light in a side backlight unit for use in a liquid crystal display device, the lamp reflector comprising: a reflector body defining an accommodation space for the lamp; a light reflection layer formed on the surface facing toward the accommodation space of the reflector body; and a transparent protective layer formed on the light reflection layer, the transparent protective layer having a thickness of less than 5 micrometers.

In the lamp reflector of the present invention, since the thickness of the transparent protective layer for protecting the light reflection layer is less than 5 micrometers, the generation of the bright lines can be suppressed. Moreover, for further suppression of the generation of the bright lines, the thickness of the transparent protective layer is preferably 3.5 micrometers or less, and more preferably 2 micrometers or less.

In the lamp reflector of the present invention, the reflector body can be formed using a material similar to that of the support body to be described below. Moreover, the light reflection layer and the transparent protective layer can be formed using materials similar to those of a reflection layer and a protective layer to be described below.

According to the present invention, provided is a reflection member suitable for the lamp reflector of the present invention. Specifically, the reflection member of the present invention comprises: a sheet-shaped support body having specified rigidity; a light reflection layer for reflecting received light, the light reflection layer being formed on the support body; and a protective layer composed of a transparent film having a thickness of less than 5 micrometers, the protective layer being formed on the light reflection layer.

In the reflection member of the present invention, since the thickness of the transparent film formed on the reflection layer is less than 5 micrometers, the generation of the bright lines can be suppressed by using the reflection member as the lamp reflector of the liquid crystal display device.

In the reflection member of the present invention, the support body must be provided with specified rigidity required for the lamp reflector when it is used as the lamp reflector. In the case where the support body is used as the lamp reflector, a metal sheet material made of brass, stainless steel or the like can be used. Since stainless steel has higher rigidity than brass, it is effective to use stainless steel when it is desired that the thickness of the support body is to be thin.

In the reflection member in accordance with the present invention, the reflection layer formed on the support body is not particularly limited. However, in consideration that the reflection layer is used as the lamp reflector, a metal material with high reflectivity can be used. Examples of metal materials having high reflectivity include Ag, Al and Pt. Among the above, Ag is the most desirable for its high reflectivity.

As described above, the protective layer formed on the reflection layer is composed of a transparent film having the thickness of less than 5 micrometers. Although the protective layer is a layer for protecting the reflection layer, which is an underlying layer thereof, from a property change such as oxidation, the protective layer is also a light transmitting film for securing the light reflecting function of the reflection layer. Examples of a substance that can be used as the protective layer include a metal-series compound such as $SiO_2$, $TiO_2$, $ZnO$, $MgO$, $ZnF$, $MgO$ and indium tin oxide (ITO). Such a compound may be used alone, or two or more of the compounds may be laminated. The protective layer may be formed using a method such as vacuum deposition, sputtering or chemical vapor plating. Moreover, a resin film, for example, made of acryl-series resin or polycarbonate can be used as the protective layer. When a resin film is used as the protective layer, a method such as spin coating or dip coating can be employed.

BRIEF DESCRIPTION OF THE DRAWINGS

For a more complete understanding of the present invention and the advantages thereof, reference is now made to the following description taken in conjunction with the accompanying drawings.

FIG. 5 is a view schematically illustrating the light transmission behavior in the vicinity of the incident surface of a light guide plate.

FIG. 6 is a table showing criteria for a sensory test regarding bright lines.

FIG. 7 is a graph showing results of the sensory test regarding the bright lines.

DETAILED DESCRIPTION OF TEE PREFERRED EMBODIMENTS

Hereinbelow, description will be made for the present invention based on an embodiment with reference to the accompanying drawings.

Figure 1:
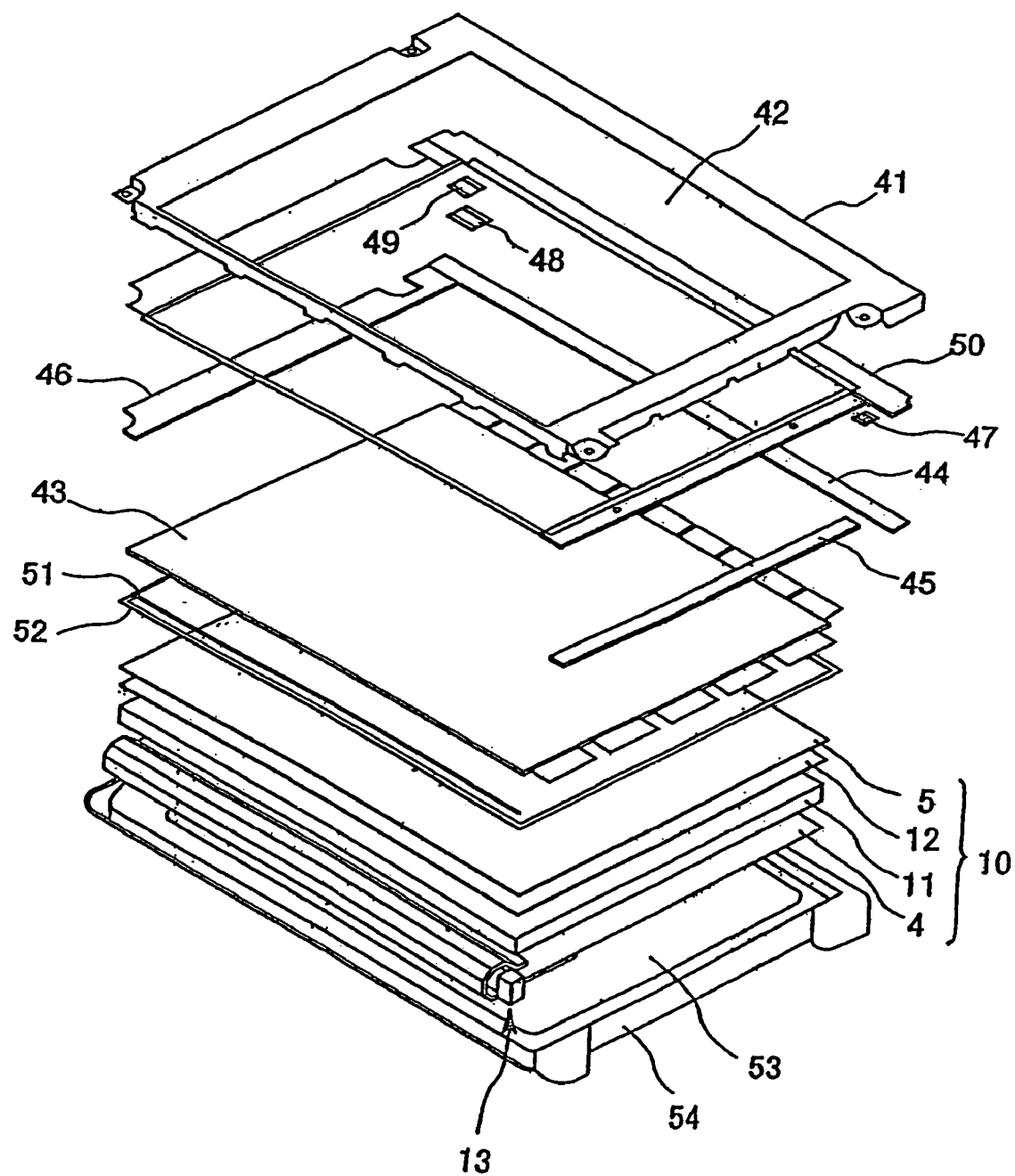
FIG. 1 is a perspective view for explaining an entire configuration of a liquid crystal display device according to an embodiment of the present invention.

FIG. 1 is a perspective view for explaining an entire configuration of the liquid crystal display device in this embodiment. A reference numeral 41 denotes a metal shield case for forming an upper frame, which forms a display window 42 defining an effective screen of a liquid crystal display module. A numeral 43 denotes a liquid crystal display panel, in which thin film transistors (TFTs), each having source/drain electrodes, a gate electrode, an amorphous silicon layer and the like deposited thereon, and color filters are laminated between two glass substrates. On the liquid crystal display panel 43, a drain circuit substrate 44, a gate circuit substrate 45 and an interface circuit substrate 46 are formed, and furthermore, joiners 47, 48 and 49 are provided for joining the circuit substrates. These circuit substrates 44, 45 and 46 are fixed to the shield case 41 with an insulating sheet 50 interposed therebetween.

Meanwhile, under, or the backside of, the liquid crystal display panel 43, a light shielding spacer 52 is provided with a rubber cushion 51 interposed therebetween, and furthermore, a backlight unit 10 for irradiating planar light onto the liquid crystal display panel 43 is provided.

Figure 2:
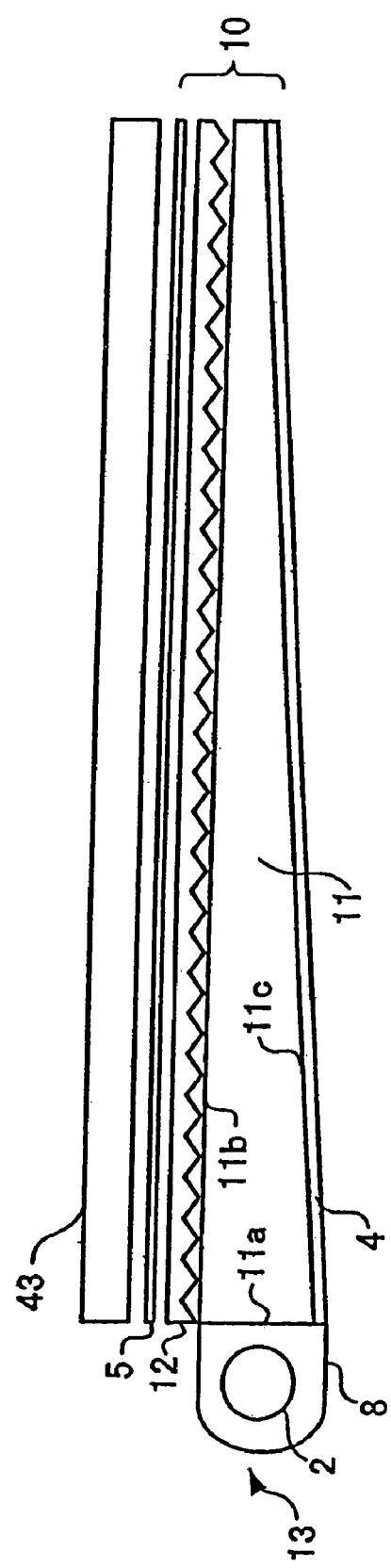
FIG. 2 is a sectional view showing the principal configuration of the liquid crystal display device according to an embodiment of the present invention.
Figure 3A:
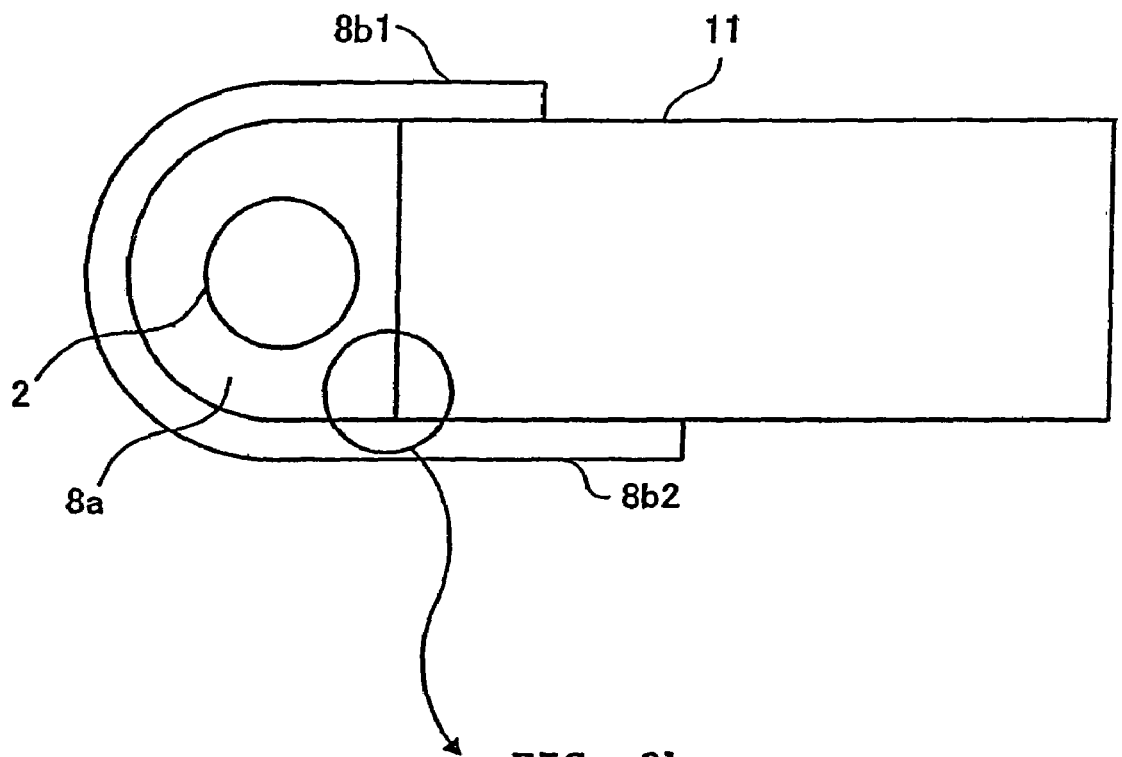
FIG. 3a is a sectional view of a backlight unit and FIG. 3b is a partially enlarged view of the same according to an embodiment of the present invention.
Figure 3B:
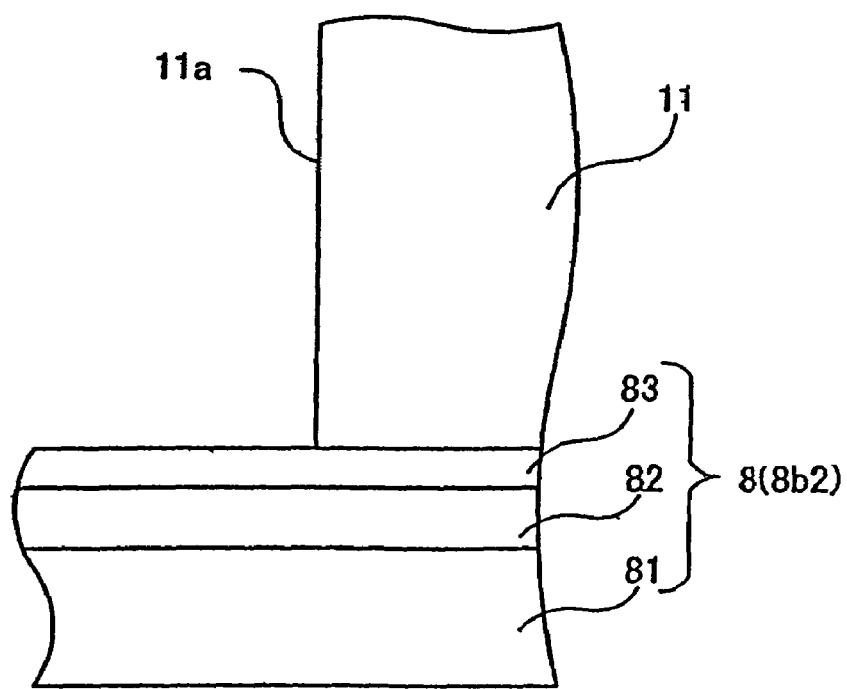
Figure 4:
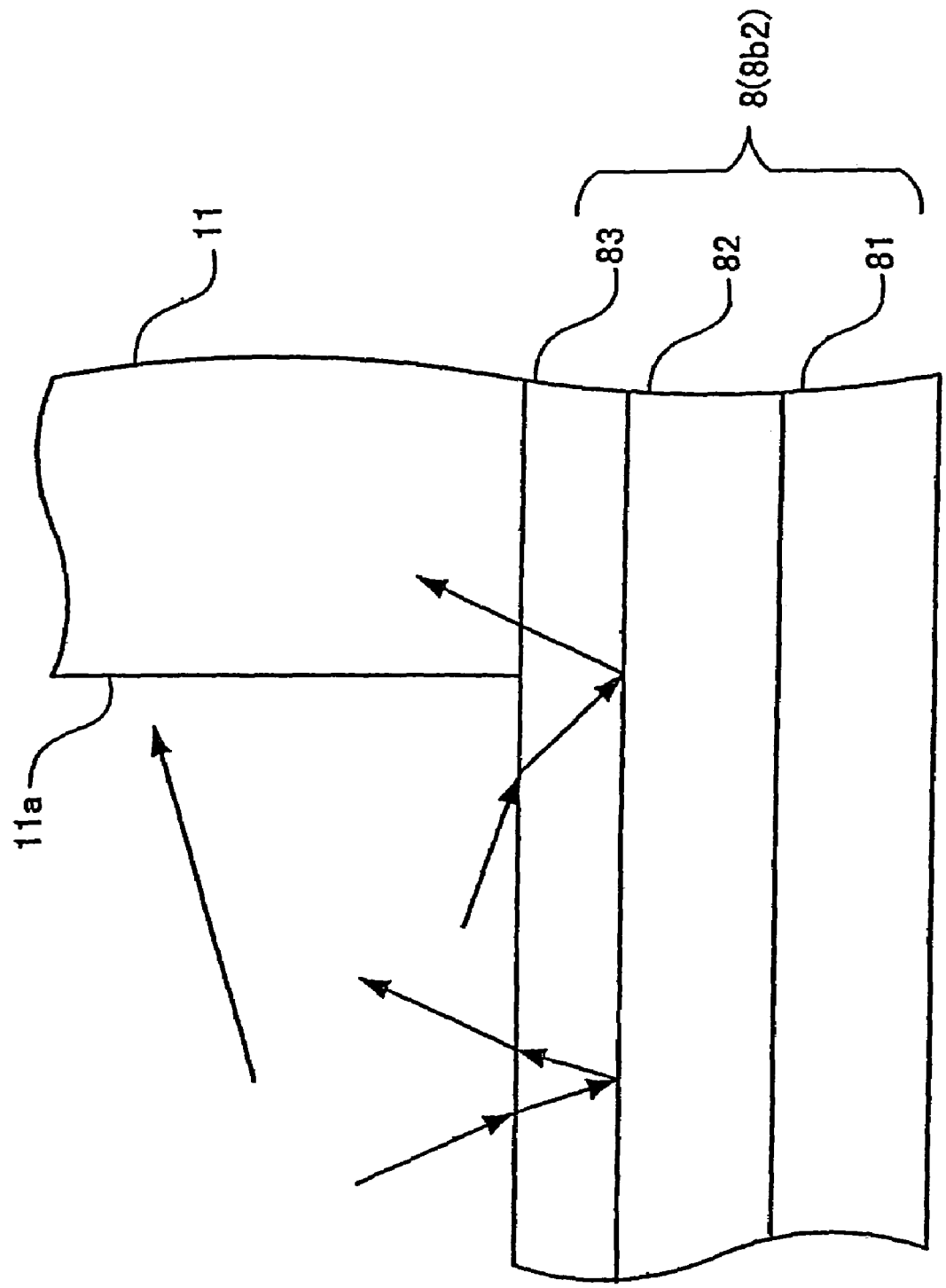
FIG. 4 is a view schematically illustrating the light transmission behavior in the vicinity of an incident surface of a light guide plate.
Figure 8:
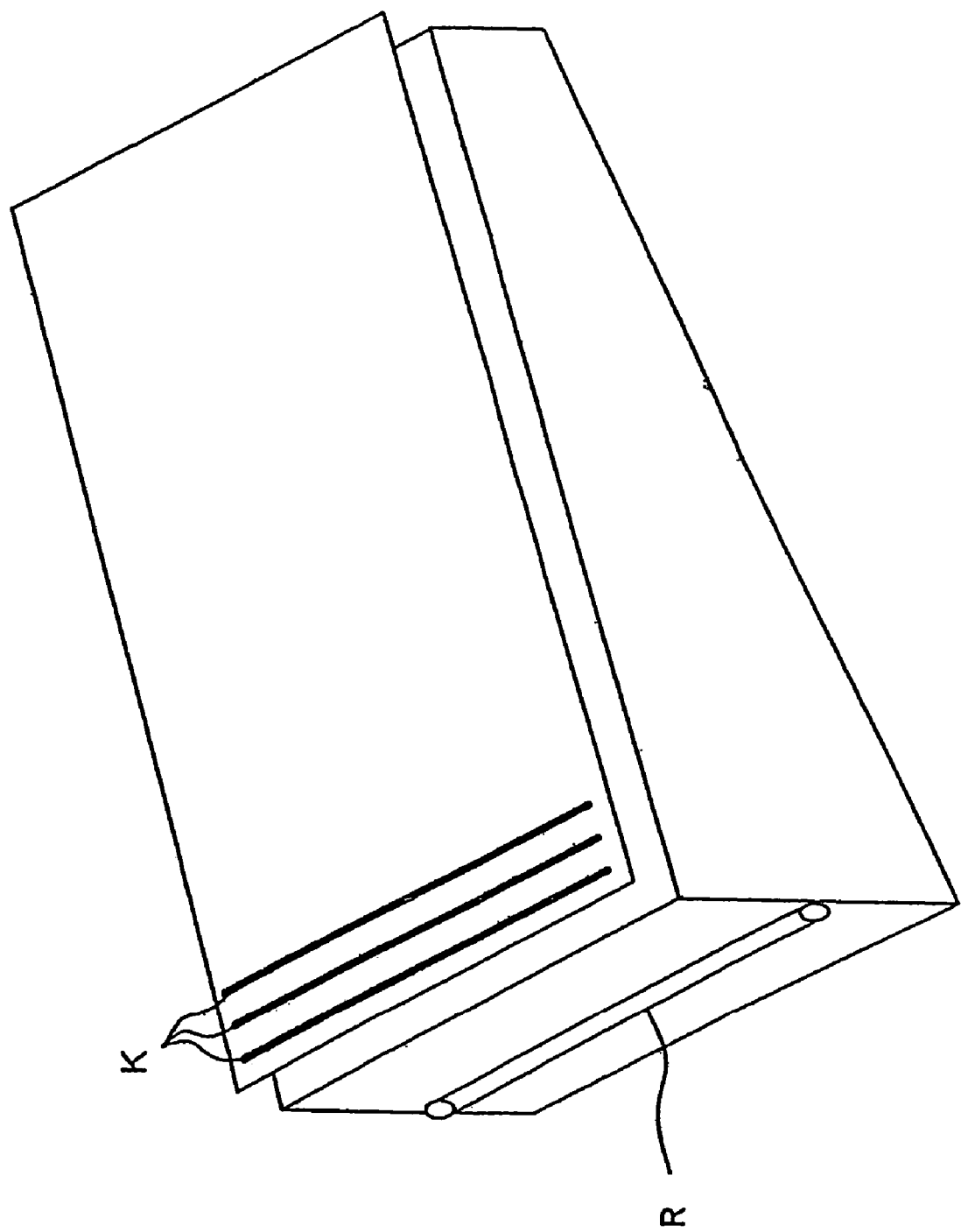
FIG. 8 is a view illustrating a generation state of the bright lines.

FIG. 2 is a sectional view showing a configuration of the backlight unit 10. As shown in FIGS. 1 and 2, the backlight unit 10 includes: a light guide plate 11; a prism sheet 12 provided on a surface of the light guide plate 11; a diffusion sheet 5; and a reflection sheet 4 provided under the light guide plate 11. Moreover, on one side of the light guide plate 11, a lamp unit 13 constituting the backlight unit 10 is provided. Furthermore, as shown in FIG. 1, a lower case 54 having an opening 53 is provided under the reflection sheet 4.

For obtaining even planar light, the diffusion sheet 5 has a function of diffusing light from the prism sheet 12 to be described later. The diffusion sheet 5 may be formed, for example, using acrylic beads, each having a diameter of, for example, about 30 micrometers to 50 micrometers, which are arranged as diffusing agents on a surface of a sheet-shaped base material made of, for example, PET. Here, a diffusion effect can be obtained due to the uneven shape of the surface of the diffusion sheet 5, which is formed by the acrylic beads. Alternatively, a diffusion sheet 5 may be formed using acrylic beads, each having a diameter of, for example 30 micrometers to 50 micrometers, which are kneaded as diffusing agents into a sheet-shaped base material made of, for example, polycarbonate (PC). Here, the diffusion effect is obtained due to a difference in refractive indices between the base material (polycarbonate) and the kneaded acrylic beads.

The prism sheet 12 is used for increasing the luminescence in the front direction. Here, as shown in FIG. 2, a so-called "downward" prism sheet 12 is used, in which concave grooves and convex grooves acting as diffusing prism surfaces are alternately formed on the lower surface of the sheet. However, the effect of the present invention can also be obtained by using an "upward" prism sheet.

The reflection sheet 4 is configured so as to be able to reflect the light incident onto the light guide plate 11 from the lamp unit 13 toward the direction of the liquid crystal display panel 43. The reflection sheet 4 may be formed from one of a white color series, one made of metal such as silver and aluminum, or one coated with such metal or the like.

The lamp unit 13 is also constituted of a lamp 2, such as a fluorescent lamp, and of a metal lamp reflector 8 made of a metal plate such as a stainless steel plate or a brass plate, for example, which covers a periphery of the lamp 2. The lamp reflector 8 forms a light reflection layer 82 by using a metal material having a high reflectivity such as Ag, Al and Pt. This light reflection layer 82 usually has a thickness of about several hundred micrometers. This lamp reflector 8 has an opening on the incident surface 11a side of the light guide plate 11. The light of the lamp 2 is reflected by the light reflection layer 82 of the lamp reflector 8, and the entirety of the light from the lamp 2 is made incident onto the light guide plate 11 from the opening.

The light guide plate 11 is preferably formed of acrylic resin having a thickness of about 1 mm to 4 mm. An example of an acrylic resin having excellent light transmittance is represented by polymethyl methacrylate (refractive index: 1.49, critical reflection angle: 48 degrees), or an acryl-series monomer/comonomer. Note that the light guide plate 11 may also contain titanium oxide (TiO2) for scattering the light.

The light guide plate 11 includes: an incident surface 11a for receiving the light from the lamp 2; an emitting surface (front) 11b for emitting the light incident onto the incident surface ha to the outside; and an opposite surface (back) 11c opposite the emitting surface 11b.

Preferably, printing of a pattern for reflecting light, for example a dot-shaped pattern, is performed on the opposite surface 11c, the emitting surface 11b or both of the above of the light guide plate 11 for causing diffuse reflection. Moreover, although the thickness of the light guide plate 11 may be even from the incident surface 11a to the other end, the light guide plate 11 is preferably formed so as to become gradually thinner from the incident surface 11a to the other end for improving its light diffusion property.

FIG. 5 is a view illustrating the behavior of light transmission in the vicinity of the incident surface 11a of the light guide plate 11.

In FIG. 5, the lamp reflector 8 includes a light reflection layer 82 on a reflector body 81, and further, a transparent protective layer 83 is formed on the light reflection layer 82 for protecting the light reflection layer 82 from a property change such as oxidation.

As shown in FIG. 5, when the transparent protective layer 83 exists, light is incident onto the inside of the transparent protective layer 83, and light is reflected by the light reflection layer 82 to be made incident onto the light guide plate 11. The incident angle of the light thus made incident does not coincide with that of the light incident from the incident surface 11a. In the case where the light is incident onto the incident surface 11a, regardless of direction from which the light is made incident, the light is converged due to the difference in the refractive indices between air and the light guide plate 11. When the light guide plate 11 is made of acrylic resin, since the refractive index of the acrylic resin is about 1.49, the light incident onto the inside of the light guide plate 11 is converged at an angle of about 42 degrees. By contrast, the light incident onto the inside of the light guide plate 11 after being incident onto the transparent protective layer 83 has a convergent axis shifted by 90 degrees from that of the light incident from the incident surface 11a since the refractive indices of the acrylic resin and the PET are approximately equal to each other. The light incident at this angle is emitted without satisfying the conditions for total reflection at the interface between the light guide plate 11 and air. Specifically, although the opportunity for emission of the light from the light guide plate 11 should be triggered by the reflection structure, such as the dot-shaped printing provided on the light guide plate 11, the light is emitted regardless, thus causing the generation of the bright lines.

Light converged toward the zenith direction by the downward prism sheet 12 is the light emitted from the light guide plate 11 at an angle of about 75 degrees. In this case, the light incident onto a length "L" portion at an angle of about 75 degrees goes through an optical path as shown in FIG. 5, and is emitted from the light guide plate 11. The light then becomes visible as a bright line.

The following is a discussion of the thickness d of the transparent protective layer 83.

The length L relating to the bright line is obtained by the following equation:

$$L = 2 \times d \times \tan(\arcsin(\sin(\text{incident angle})/1.57)).$$

When the light is incident at an angle of 75 degrees, the length L is: L=1.56×d. Specifically, it is understood that the thickness d of the transparent protective layer 83 has a linear relation with the intensity of the bright lines and that the generation of the bright lines can be reduced or prevented if the thickness d is made small.

Next, investigation was made to find out how thick the transparent protective layer 83 must be in order to make the bright lines inconspicuous.

Five types of lamp reflectors 8 were prepared, each having a transparent protective layer 83 with thickness of: 0.1 micrometers; 1.0 micrometers; 2.0 micrometers; 12.5 micrometers; and 25 micrometers, respectively. Then, a sensory test was performed with a subject. Concretely, perception of the intensity of the bright lines was confirmed based on the intensity criteria shown in FIG. 6. FIG. 7 shows the test results.

When the thickness of the transparent protective layer 83 was 25 micrometers, conspicuous bright lines were observed. When the thickness of the transparent protective layer 83 was 12.5 micrometers, although the bright lines were observed, the intensity thereof was weaker. When the thickness of the transparent protective layer 83 was 2.0 micrometers or less, no bright lines were observed. According to the intensity criteria shown in FIG. 6, the intensity level of the periodic bright lines is 0 if the periodic bright lines are perceived by a human subject to be invisible, and the intensity level is 3 if the periodic bright lines are perceived to be a little visible by the subject, and the intensity level is 5 if the periodic bright lines are perceived to be conspicuous by the subject. Although it is desirable that no bright lines be observed, meaning that the intensity level of the bright lines is 0, an intensity level of the bright lines is acceptable up to 1. Tn order to set the intensity level of the bright lines at 1 or lower, it will be necessary to set the thickness of the transparent protective layer 83 at less than 5 micrometers when a tendency shown in FIG. 7 is concerned.

As described above, setting the thickness of the transparent protective layer 83 at less than 5 micrometers, in accordance with the present invention, preferably at less than 3.5 micrometers, and more preferably at less than 2 micrometers, results in a transparent protective layer 83 that is configured so as to reduce the influence of the light from the lamp 2. Similarly, when a transparent protective layer 83 is configured in such a manner in accordance with the present invention, light not meeting the total reflection conditions in the light guide plate 11 is controlled so as not to be made incident from the front, including the emitting surface 11b, and the back 11c of the light guide plate 11. Consequently, the generation of the bright lines can be reduced or prevented.

In the above embodiment, the transparent protective layer 83 has been the subject of the description. However, as described above, the present invention is applicable also to the case where other layers capable of light transmission therethrough exist between the light reflection layer 82 and the light guide plate 11.

Moreover, in the above embodiment, description as been made for the relation between the lower arm 8b2 of the lamp reflector 8 and the light guide plate 11. However, the present invention is also applicable to the relation between the upper arm 8b1 and the light guide plate 11.

As described above, according to the present invention, the generation of bright lines can be reduced or prevented.

Although a preferred embodiment of the present invention has been described in detail, it should be understood that various changes, substitutions and alterations can be made therein without departing from the spirit and the scope of the invention as defined by the appended claims.

What is claimed is:

1. A method of forming a side backlight unit, the method comprising:

providing a reflector body having a curved inner circumference surface, the lamp reflector having arm portions having arm surfaces extending from said inner circumference surface and said arm surfaces facing each other and configured to receive a light guide plate between said arm surfaces;

forming a conformal light reflection layer on said curved inner circumference surface and said arm surfaces of said reflector body;

forming a conformal transparent protective layer on said light reflection layer after said light reflection layer is formed on said inner circumference surface and said arm surfaces of said reflector body; and configuring said reflector body with a light guide plate including an incident surface, an emitting surface adjoining said incident surface, and a back surface adjoining said incident surface and opposing said emitting surface, such that said arm surfaces sandwich said emitting surface and said back surface of said light guide plate on said incident surface side and defines light transmission regions between said arm surfaces and said emitting surface and said back surface, wherein said light transmission regions between said arm surfaces and said emitting surface and said back surface have thicknesses sufficiently small so that periodic bright lines on said incident surface are at an inconspicuous level defined at intensity level 1 or lower, as determined by a sensory test performed with a human subject observing light emerging from said emitting surface provided by a lamp disposed along said incident surface, wherein an intensity level of said periodic bright lines is 0 if said periodic bright lines are perceived to be invisible by said subject, said intensity level is 3 if said periodic bright lines are perceived to be a little visible by said subject, and said intensity level is 5 if said periodic bright lines are perceived to be conspicuous by said subject.

2. A method of forming a liquid crystal display device, the method comprising:

providing a reflector body having a curved inner circumference surface, the lamp reflector having arm portions having arm surfaces extending from said inner circumference surface and said arm surfaces facing each other and configured to receive a light guide plate between said arm surfaces;

forming a conformal light reflection layer on said curved inner circumference surface and said arm surfaces of said reflector body;

forming a conformal transparent protective layer on said light reflection layer after said light reflection layer is formed on said inner circumference surface and said arm surfaces of said reflector body; and configuring said reflector body with a light guide plate including an incident surface, an emitting surface adjoining said incident surface, and a back surface adjoining said incident surface and opposing said emitting surface, such that said arm surfaces sandwich said emitting surface and said back surface of said light guide plate on said incident surface side and defines light transmission regions between said arm surfaces and said emitting surface and said back surface, wherein said light transmission regions between said arm surfaces and said emitting surface and said back surface have thicknesses sufficiently small so that periodic bright lines on said incident surface are at an inconspicuous level defined at intensity level 1 or lower, as determined by a sensory test performed with a human subject observing light emerging from said emitting surface provided by a lamp disposed along said incident surface, wherein an intensity level of said periodic bright lines is 0 if said periodic bright lines are perceived to be invisible by said subject, said intensity level is 3 if said periodic bright lines are perceived to be a little visible by said subject, and said intensity level is 5 if said periodic bright lines are perceived to be conspicuous by said subject.

* * * * *